United States Patent [19]

Bodtker et al.

[11] Patent Number: 5,320,587
[45] Date of Patent: Jun. 14, 1994

[54] DIFFERENTIAL CASE WITH RING GEAR ATTACHMENT

[75] Inventors: Joen C. Bodtker, Flint; Norman E. Schultz, Saginaw, both of Mich.

[73] Assignee: General Motors Corporation, Detroit, Mich.

[21] Appl. No.: 18,593

[22] Filed: Feb. 17, 1993

[51] Int. Cl.⁵ .................... F16H 55/12; F16H 1/40; B23P 15/14
[52] U.S. Cl. .................... 475/230; 29/432; 29/525; 29/893.2; 74/447; 403/359
[58] Field of Search .......... 74/446, 447; 29/432, 29/525, 893.1, 893.2; 403/359; 475/230

[56] References Cited

U.S. PATENT DOCUMENTS

| | | | |
|---|---|---|---|
| 2,069,411 | 2/1937 | Keese | 74/447 X |
| 3,100,333 | 8/1963 | Friend | 29/893.1 |
| 3,727,254 | 4/1973 | Tildesley | 10/86 R |
| 3,853,413 | 12/1974 | Parran | 403/318 |
| 3,901,103 | 8/1975 | Hufstader | 74/713 |
| 4,376,333 | 3/1983 | Kanamaru et al. | 29/893.2 X |
| 4,628,753 | 12/1986 | Heine et al. | 74/447 |
| 4,728,216 | 3/1988 | Disborg | 29/432 X |
| 4,741,225 | 5/1988 | Hall, III et al. | 74/606 R |

*Primary Examiner*—Allan D. Herrmann
*Attorney, Agent, or Firm*—Saul Schwartz

[57] ABSTRACT

A differential in a motor vehicle drive axle includes a barrel shaped case and a ring gear. The case has an outer cylindrical boss and an adjacent smaller inner cylindrical boss. The ring gear has a flat side facing the case, a plurality of self-cutting straight splines around the center of the ring gear, and a counterbore in the flat side concentric with the self-cutting splines. The self-cutting splines have a major diameter corresponding to the diameter of the inner boss so that when the ring gear is forcibly moved to an assembled position on the case, the self-cutting splines form in situ on the inner boss a plurality of mating straight splines in mesh with the self-cutting splines. The depth of the counterbore is coordinated with the length of the inner boss to achieve penetration of the outer boss into the counterbore at the time the self-cutting splines engage the inner bore so that a closed chip trap is defined ahead of the self-cutting splines.

5 Claims, 3 Drawing Sheets

DIFFERENTIAL CASE WITH RING GEAR ATTACHMENT

FIELD OF THE INVENTION

This invention relates to differentials in final drive axles of motor vehicles.

BACKGROUND OF THE INVENTION

A differential in a final drive axle of a motor vehicle divides engine torque between axle shafts of the vehicle while permitting the shafts to rotate independently of each other. Typically, a case of the differential is rotatably supported on an axle housing with a ring gear on the case meshing with a hypoid pinion on the housing. Torque is transferred from the ring gear to the case through a plurality of bolts which attach the ring gear to a flange on the case. A differential according to this invention features an attachment between the ring gear and the case which affords improvements in manufacturability, assembly, and raw material usage relative to the aforesaid bolt-type attachment.

SUMMARY OF THE INVENTION

This invention is a new and improved differential in a final drive axle of a motor vehicle, the differential including a case, an annular ring gear, and a spline joint formed in situ between the ring gear and the case. The ring gear has a plurality of self-cutting internal splines which engage an inner cylindrical boss on the case and which cut mating external splines on the inner boss during forced movement of the ring gear over the inner boss to an assembled position against a stop. A counterbore in a flat side of the ring gear concentric with the self-cutting splines cooperates with an outer cylindrical boss on the case concentric with the inner boss to define a chip trap which confines metal chips or shavings created by the self-cutting splines during movement of the ring gear to its assembled position to prevent migration of chips to the space between ring gear and the stop on the case.

DESCRIPTION OF PREFERRED EMBODIMENTS

Figure 1:
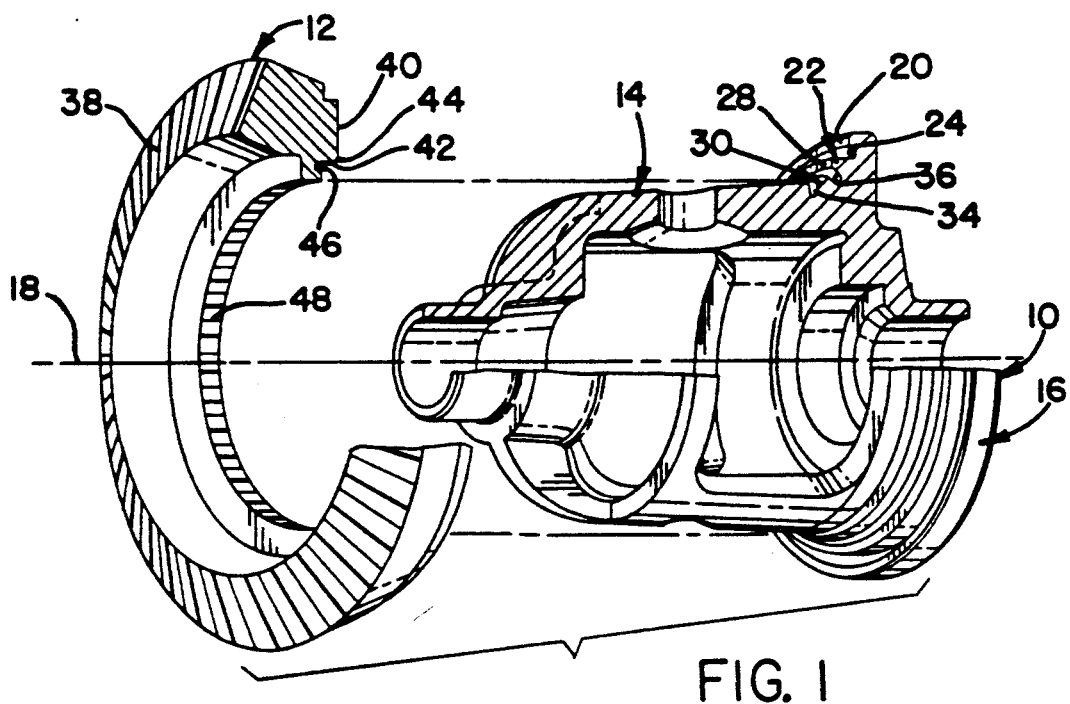
FIG. 1 is a fragmentary, exploded perspective view of a differential according to this invention.

Referring to FIGS. 1-4, a differential for a final drive axle of a motor vehicle, not shown, includes a fragmentarily illustrated case 10 and a similarly fragmentarily illustrated ring gear 12. The case is generally barrel shaped and includes a body 14 and an external annular flange 16. Conventional side gears and differential pinions, not shown, are contained within the case. The case 10 has integral trunnions, not shown, at which it is supported on a drive axle housing, not shown, in conventional fashion for rotation about an axis 18 of the housing, FIG. 1.

Figure 2A:
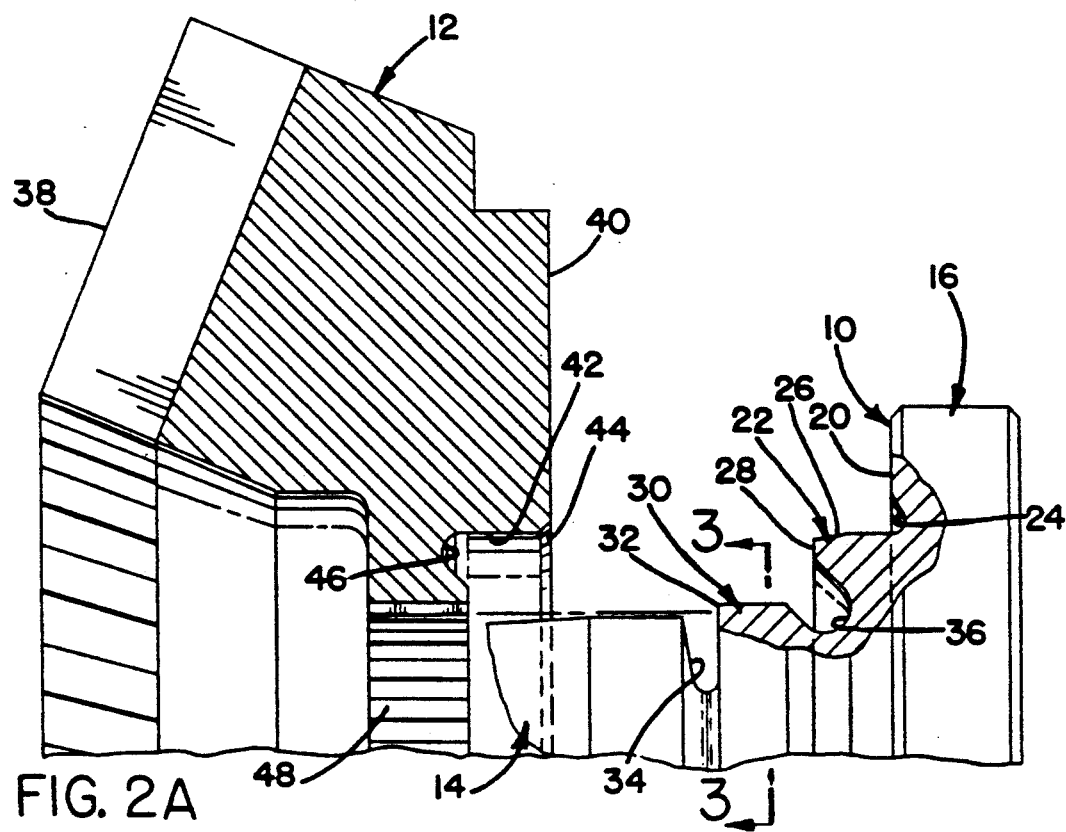
FIGS. 2A-D are fragmentary, partially broken-away views of the differential according to this invention illustrating installation of a ring gear thereof on a case thereof.
Figure 2B:
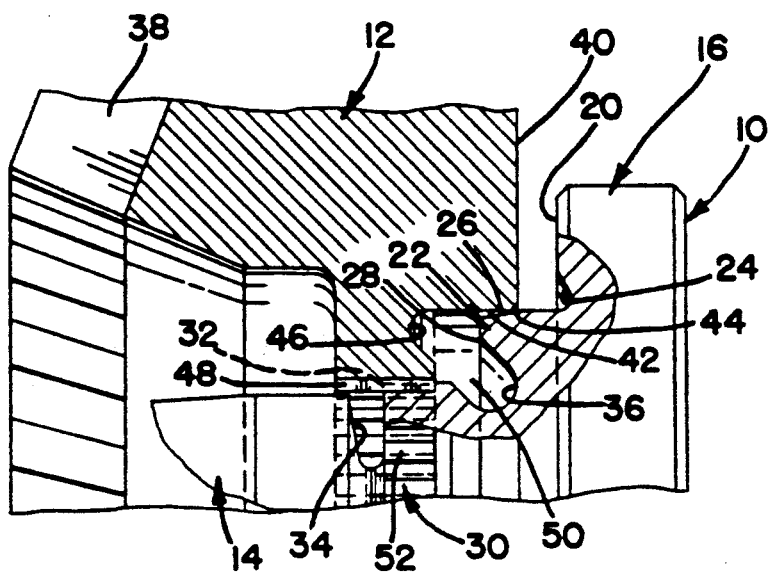

As seen best in FIG. 2A, the flange 16 on the case 10 has an annular planar seat 20 in a plane perpendicular to the axis 18. The seat 20 encircles a first or outer cylindrical boss 22 on the case 10 concentric with the axis 18. A groove 24 undercuts or recesses the junction between the outer boss 22 and the annular seat 20. The outer boss 22 has a modest conical taper 26 adjacent an outboard end 28 thereof.

The case 10 further includes a second or inner cylindrical boss 30 concentric with the axis 18 and longitudinally adjacent to the outer boss 22. The diameter of the inner boss 30 exceeds the diameter of the body 14 of the case 10 next to the boss to expose a circular outboard edge 32 of the inner boss around the case, FIG. 2A. A retaining ring groove 34 is formed in the body 14 of the case beyond the outboard edge 32 of the inner boss. A groove 36 undercuts or recesses the junction of the inner and the outer bosses.

The ring gear 12 has a toothed side 38 and an annular flat side 40. The flat side 40 has a cylindrical counterbore 42 therein around the opening in the center of the ring gear. The diameter of the counterbore 42 corresponds generally to the diameter of the outer boss 22. The edge of the counterbore 42 at the flat side 40 is relieved by a chamfer 44, FIG. 2A. A groove 46 is formed in the counterbore 42 at the junction of the bottom and the side thereof. The opening in the center of the ring gear is bounded by a cylindrical wall on which are formed a plurality of straight, self-cutting splines 48 having a major diameter corresponding generally to, i.e. slightly larger than, the diameter of the inner boss 30, FIG. 3.

The ring gear 12 is attached to the case 10 as follows. The ring gear is positioned around the body of the case with the flat side 40 facing the annular seat 20 on the flange 16, FIG. 2A, and then advanced toward the flange. The depth of the counterbore 42 in the ring gear is coordinated with the length of the inner boss 30 on the case to achieve penetration of the outer boss 22 into the counterbore at about the same time the self-cutting splines 48 encounter the outboard edge 32 of the inner boss. In that circumstance, the counterbore 42 and the outer boss 22 cooperate in defining a closed chip trap 50, FIG. 2B, ahead of the advancing self-cutting splines which trap is isolated from the space between the flat side 40 and the stop on the case defined by the annular seat 20.

The counterbore 42 further cooperates with the outer boss 22 in piloting the ring gear on the case. After the onset of penetration of the outboard end 28 into the counterbore, the taper 26 guides the counterbore into alignment with the outside diameter of the outer boss. Then, as the self-cutting splines are forced progressively further over the inner boss 30, the outer boss maintains the concentricity of the ring gear relative to the axis 18 and the perpendicularity of the flat side 40 relative to the axis 18.

Figure 2C:
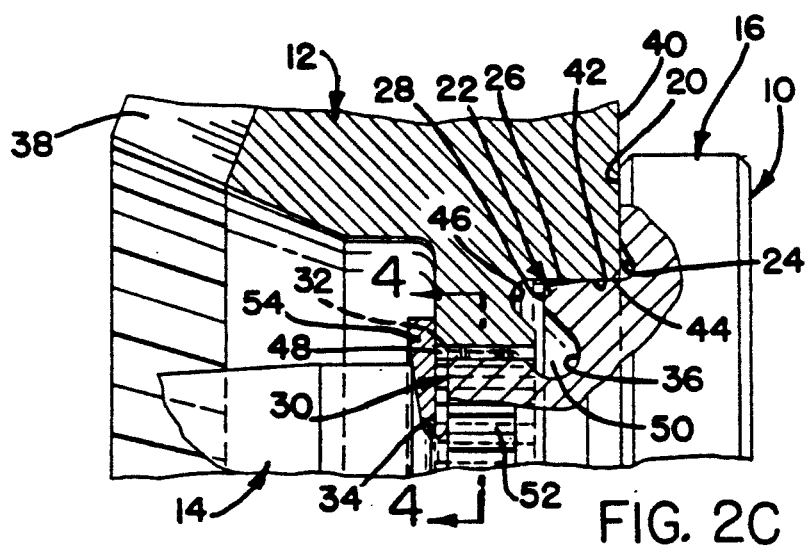
Figure 2D:
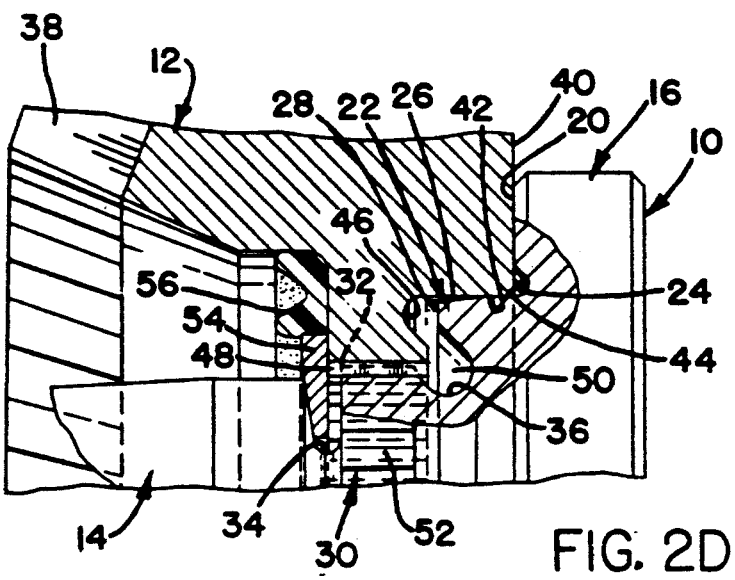

An assembled position of the ring gear relative to the case is achieved when the flat side 40 butts or seats against the stop defined by the annular seat 20, FIG. 2C. Because metal chips or shavings created by the self-cutting splines 48 are confined to the chip trap 50, the interface between the flat side and the annular seat is uncontaminated. The groove 36 in the chip trap fully accommodates metal chips when the ring gear achieves its assembled position. Similarly, the grooves 24,46 accommodate non-chip debris which could otherwise accumulate and interfere with the ring gear attaining its assembled position.

Figure 4:
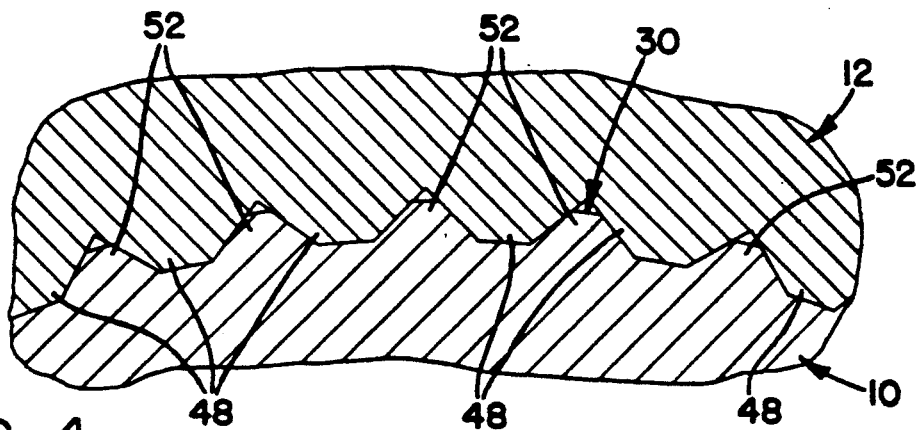
FIG. 4 is an enlarged view taken generally along the plane indicated by lines 4—4 in FIG. 2C.
Figure 3:
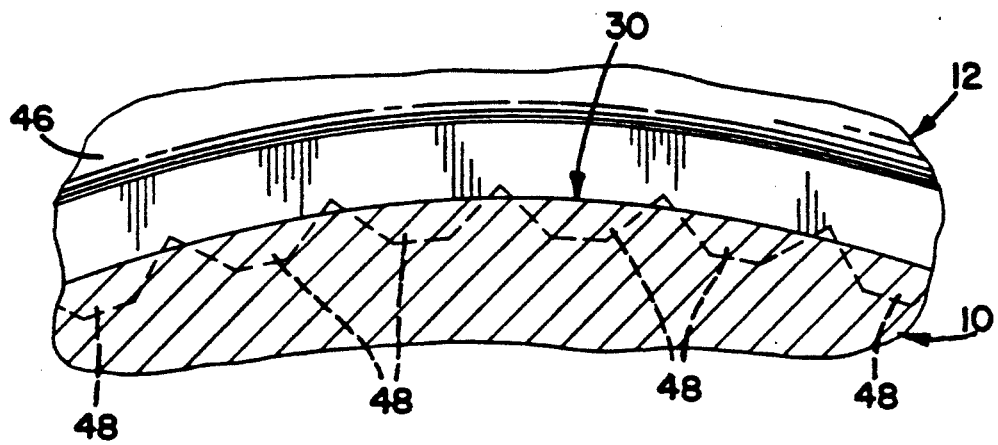
FIG. 3 is an enlarged view taken generally along the plane indicated by lines 3—3 in FIG. 2A.

In the assembled position of the ring gear, the self-cutting splines 48 and a corresponding plurality of mating splines 52 formed thereby on the inner boss 30, FIG. 4, engage over substantially the full length of the inner boss 30 for maximum torque transfer capability between the ring gear and the case. For positive retention of the ring gear 12 in its assembled position on the case, a resiliently expandable retaining ring 54 may be seated in the groove 34, FIG. 2C. An in situ molded plastic ring 56, FIG. 2D, may be formed around the retaining ring 54 to secure the latter against centrifugal force induced expansion out of the groove 34.

Figure 5:
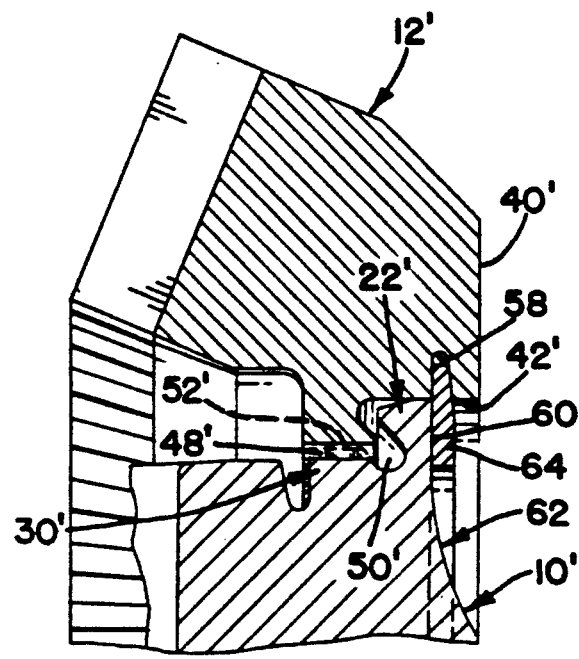
FIG. 5 is a view similar to FIG. 2D but illustrating a modified differential according to this invention.

A modified differential according to this invention is fragmentarily illustrated in FIG. 5. Features common to both differentials embodiments are identified by primed reference characters. The modified differential includes a case 10' and a ring gear 12'. The case 10' has an outer cylindrical boss 22' and an inner cylindrical boss 30' adjacent the outer boss. The ring gear 12' has a planar flat side 40' with a counterbore 42' therein and a plurality of straight, self-cutting splines 48' in the center of the ring gear.

The self-cutting splines are engaged with a corresponding plurality of mating splines 52' formed on the inner boss 30', when the ring gear 12' is forcibly moved to an assembled position on the case, FIG. 5. The counterbore 42' cooperates with the outer boss 22' in defining a chip trap 50' which confines metal chips or shavings formed by the self-cutting splines 48' as described above.

The assembled position of the ring gear 12' on the case 10' is defined by registration of an internal groove 58 in the ring gear with a bottom wall 60 of an annular groove 62 in the case. A resilient retaining ring 64 is compressed to fit into the counterbore 42' and is then allowed to expand into the internal groove 58 so that portions of the retaining ring overlap the ring gear and the case to prevent separation therebetween. The internal groove 58 positively reinforces the retaining ring 64 against centrifugal force induced expansion.

The embodiments of the invention in which an exclusive property or privilege is claimed are defined as follows:

1. In a differential in a motor vehicle drive axle, the combination comprising:
   a case having an outer cylindrical boss concentric about an axis of rotation of said case and a smaller inner cylindrical boss adjacent said outer cylindrical boss and concentric about said axis of rotation of said case,
   an annular ring gear having a toothed side and a flat side opposite said toothed side and a plurality of self-cutting straight splines in an inner cylindrical wall of said ring gear with a major diameter corresponding generally to the diameter of said inner cylindrical boss,
   said self-cutting splines engaging said inner boss during forced movement of said ring gear to an assembled position on said case and being operative to form in situ on said inner boss a corresponding plurality of mating splines in mesh with said self-cutting splines for torque transfer between said ring gear and said case, and
   means defining a cylindrical counterbore in said flat side of said ring gear concentric with said inner cylindrical wall of said ring gear having a diameter corresponding generally to the diameter of said outer cylindrical boss and a depth coordinated with the length of said inner cylindrical boss to achieve penetration of said outer cylindrical boss into said counterbore at about the time said self-cutting splines engage said inner cylindrical boss so that a closed chip trap is defined ahead of said self-cutting splines.

2. The differential recited in claim 1 further including:
   means defining a conical taper on said outer boss adjacent an outboard end thereof engageable on said counterbore to guide said ring gear into concentricity about said axis of rotation of said case during movement of said ring gear to its assembled position.

3. The differential recited in claim 2 further including:
   retaining means between said ring gear and said case operative to positively prevent dislodgement of said ring gear from its assembled position on said case.

4. The differential recited in claim 3 wherein said retaining means includes:
   means defining an external annular groove in said case,
   an annular resiliently expandable retaining ring seated in said external groove engageable on said ring gear to prevent dislodgement of said ring gear from its assembled position, and
   locking means engageable on said retaining ring to prevent centrifugal force induced expansion of said retaining ring during unitary rotation of said case and said ring gear.

5. The differential recited in claim 3 wherein said retaining means includes:
   means defining a planar surface on said case perpendicular to said axis of rotation of said case and intersecting said outer cylindrical boss on said case,
   means defining an annular internal groove in said counterbore disposed generally in the plane of said planar surface on said case when said ring gear is in its assembled position on said case, and
   a resiliently expandable retaining ring in said internal annular groove engageable on said planar surface on said case to prevent dislodgement of said ring gear from its assembled position.

* * * * *